(12) United States Patent
Ohmi et al.

(10) Patent No.: US 6,898,310 B1
(45) Date of Patent: May 24, 2005

(54) IMAGE SIGNAL PROCESSING METHOD, IMAGE SIGNAL PROCESSING SYSTEM, STORAGE MEDIUM, AND IMAGE SENSING APPARATUS

(76) Inventors: Tadahiro Ohmi, 1-17-301, Komegafukuro 2-chome, Aoba-ku, Sendai-shi, Miyagi-ken (JP); Shigetoshi Sugawa, c/o Canon Kabushiki Kaisha 30-2, Shimomaruko 3-chome, Ohta-ku, Tokyo (JP); Isamu Ueno, c/o Canon Kabushiki Kaisha, 30-2, Shimomaruko 3-chome, Ohta-ku, Tokyo (JP); Katsuhisa Ogawa, c/o Canon Kabushiki Kaisha 30-2, Shimomaruko 3-chome, Ohta-ku, Tokyo (JP); Toru Koizumi, c/o Canon Kabushiki Kaisha 30-2, Shimomaruko 3-chome, Ohta-ku, Tokyo (JP); Tetsunobu Kochi, c/o Canon Kabushiki Kaisha 30-2, Shimomaruko 3-chome, Ohta-ku, Tokyo (JP); Katsuhito Sakurai, c/o Canon Kabushiki Kaisha, 30-2, Shimomaruko 3-chome, Ohta-ku, Tokyo (JP); Takahiro Nakayama, 2-3-112, Kunimi 5-chome, Aoba-ku, Sendai-shi, Miyagi-ken (JP); Tatsuo Morimoto, 3-2, Kaimisugi 6-chome, Aoba-ku, Sendai-shi, Miyagi-ken (JP)

( * ) Notice: Subject to any disclaimer, the term of this patent is extended or adjusted under 35 U.S.C. 154(b) by 0 days.

(21) Appl. No.: 09/343,186

(22) Filed: Jun. 30, 1999

(30) Foreign Application Priority Data

Jul. 3, 1998 (JP) .......................................... 10-204438

(51) Int. Cl.⁷ ............................................... G06K 9/00
(52) U.S. Cl. ....................... 382/166; 382/250; 348/604; 358/516
(58) Field of Search ................................ 382/162, 166, 382/167, 164, 165, 168, 232, 248, 251, 274, 276, 245, 172, 250, 253, 233; 345/597, 603, 604; 348/661, 589, 46, 93, 489; 358/504, 515, 516, 426.1, 538, 448, 467, 433, 432, 527, 522, 530, 262, 428, 539, 426, 403

(56) References Cited

U.S. PATENT DOCUMENTS

| | | | | |
|---|---|---|---|---|
| 4,797,945 A | * | 1/1989 | Suzuki et al. | 382/253 |
| 5,172,227 A | * | 12/1992 | Tsai et al. | 375/240.2 |
| 5,416,606 A | * | 5/1995 | Katayama et al. | 382/239 |
| 5,581,373 A | | 12/1996 | Yoshida | 358/476 |
| 5,740,303 A | * | 4/1998 | Ban | 386/38 |
| 5,764,386 A | * | 6/1998 | Robinson | 358/504 |
| 5,801,650 A | | 9/1998 | Nakayama | 341/67 |
| 5,818,525 A | * | 10/1998 | Elabd | 348/268 |
| 5,818,970 A | * | 10/1998 | Ishikawa et al. | 382/248 |
| 5,841,381 A | * | 11/1998 | Nakayama | 341/67 |
| 5,986,594 A | | 11/1999 | Nakayama et al. | 341/107 |

* cited by examiner

Primary Examiner—Bhavesh M. Mehta
Assistant Examiner—Seyed Azarian
(74) Attorney, Agent, or Firm—Fitzpatrick, Cella, Harper & Scinto

(57) ABSTRACT

An image signal processing method and system, which can greatly reduce the data size upon transmitting an image signal or storing the signal in a storage medium, and can obtain a high-quality image by preventing image quality after color processing from deteriorating. According to the method for processing an image signal output from an image sensing element, a compression step of compressing the image signal and an expansion step of expanding the compressed image signal are executed without executing color processing for executing at least white balance correction or correction, and the color processing is executed after completion of the compression and expansion steps, thereby preventing occurrence of block noise and high-frequency noise associated with compressing/expanding image data after the color processing of the image signal.

15 Claims, 12 Drawing Sheets

FIRST AND SECOND LINES
 PSEUDO BRIGHTNESS  $Y' = (R + 2G + B)$
 PSEUDO COLOR DIFFERENCE  $u' = (R - Y')$
  $v' = (B - Y')$

FIRST AND SECOND LINES
   PSEUDO BRIGHTNESS        $Y' = ((Ye + Mg) + (Cy + G)) \times 1/2$
                                                             $= 1/2(2B + 3G + 2R)$
   PSEUDO COLOR DIFFERENCE   $u' = ((Ye + Mg) - (Cy + G))$
                                                              $= (2R - G)$ THIRD AND FOURTH LINES
   PSEUDO BRIGHTNESS        $Y' = ((Ye + G) + (Cy + Mg)) \times 1/2$
                                                             $= 1/2(2B + 3G + 2R)$
   PSEUDO COLOR DIFFERENCE   $-v' = ((Ye + G) - (Cy + Mg))$
                                                              $= -(2R - G)$

IMAGE SIGNAL PROCESSING METHOD, IMAGE SIGNAL PROCESSING SYSTEM, STORAGE MEDIUM, AND IMAGE SENSING APPARATUS

BACKGROUND OF THE INVENTION

This invention relates to an image signal processing method, image signal processing system, storage medium, and image sensing apparatus.

An image signal processing system that processes color image signals executes predetermined color correction for original signals output from an image sensing element to generate a brightness signal and color difference signals, and displays an image represented by the brightness signal and color difference signals on an image display device or stores them in a storage medium.

Various techniques for reducing the capacity of a storage medium required for storing image data or reducing the network load upon transmitting image data in such image signal processing system have been proposed.

FIG. 10 is a block diagram showing an example of a conventional image signal processing system. As shown in FIG. 10, original signals (complementary original signals Ye, Cy, Mg, and Gr in this embodiment, but the same applies to R, G, and B signals) output from an image sensing element 201 are input to a color processing device 202.

The color processing device 202 is comprised of a pre-processing circuit 202a for executing predetermined pre-processings for the input original signals Ye, Cy, Mg, and Gr to generate a pseudo brightness signal (Y') and color difference signals (u', v'), and a color processing circuit 202b for executing color correction processings such as white balance correction, γ correction, and the like for color information using the pseudo brightness signal (Y') and color difference signals (u', v') to generate a brightness signal (Y) and color difference signals (u, v).

The brightness signal (Y) and color difference signals (u, v) output from the color processing circuit 202b are input to an information compression device 203. The information compression device 203 compresses information using a given compression technique such as JPEG, MPEG, H.261, or the like. For example, the device 203 performs the DCTs (Discrete Cosine Transforms) for the input signals in units of predetermined pixel blocks. The DCT-transformed brightness signal (Y) and color difference signals (u, v) are quantized to remove their high-frequency components, thus compressing their information sizes.

The compressed image data is input to an encoding device 204, and is encoded. As encoding, various schemes are available. For example, when variable length coding that assigns code lengths in correspondence with the frequency of occurrence of data is used, information can be further compressed. The compressed and encoded image signal is transmitted via a communication line.

On a receiving side, the image signal input via a variable length coding input device 206 is input to an information expansion device 207. The information expansion device 207 performs inverse DCT processing and inverse quantization processing contrary with the information compression device 203 to restore the brightness signal (Y) and color difference signals (u, v).

The restored brightness signal (Y) and color difference signals (u, v) are output to an image display device or storage device 208. In this manner, an image sensed by the image sensing element 201 is displayed or stored in a storage medium.

In FIG. 10, DCT and quantization are performed as information compression processeings. Besides these processings, various other compression schemes may be used. For example, as shown in FIG. 11, a compression scheme by means of vector quantization/dequantization using a code book (to be referred to as a code book compression scheme hereinafter) may be used.

Note that the same reference numerals in FIG. 11 denote the same parts as those in FIG. 10, and a detailed description thereof will be omitted.

In this prior art, a brightness signal (Y) and color difference signals (u, v) output from the color processing device 202 are input to a code book compression device 210. The code book compression device 210 employs an information compression scheme that compares the pattern of each input signal with a plurality of code books (patterns) pre-stored in a code book storage device 211, finds out the most similar pattern, assigns this pattern to input information, and outputs the code number of the pattern.

The code number output from the code book compression device 210 is output to a medium such as a communication line or the like via a code number output device 212.

On the receiving side of the image signal, the code number sent via the medium is received by a code number input device 213, and is supplied to a code book expansion device 214. The code book expansion device 214 reads out a pattern corresponding to the input code number from a code book storage device 215 to reconstruct (decode) the image signal compressed on the transmitting side. The reconstructed image signal is output to an image display device or storage device 208, thus displaying an image or storing the signal in a storage medium.

In the conventional image signal processing system, original signals (e.g., Ye, Cy, Mg, and Gr) output from the image sensing element 201 are input to the color processing device 202, which compresses a brightness signal (Y) and color difference signals (u, v) that have been subjected to various color correction signal processings, regardless of what information compression scheme is used.

In recent years, since the information compression techniques have advanced, no extreme image deterioration occurs in an image signal even after information compression. However, deterioration of image quality due to block noise and high-frequency noise produced upon information compression cannot be avoided. Hence, since the image quality deteriorates depending on the compression ratio with respect to the image signal, it is not preferable to select a high compression ratio to obtain a high-quality image.

However, when a low compression ratio is set in information compression, the size of image data used for data transmission via a line or a storage medium becomes very large.

SUMMARY OF THE INVENTION

Accordingly, it is an object of the present invention to provide an image signal processing method and image signal processing system, which can greatly reduce the data size upon transmitting an image signal or storing the signal in a storage medium and can obtain a high-quality image by preventing the image quality from deteriorating after color processing, a storage medium that stores a program for implementing the processing, and an image sensing apparatus.

According to one aspect of the present invention, the foregoing object is attained by providing an image signal processing method of processing an image signal output from an image sensing element, performing a compression step of compressing an information volume of the image signal without performing color processing which includes at least one of white balance correction and γ correction for color information, and an expansion step of expanding the compressed image signal, wherein the color processing is executed after completion of execution of the expansion step.

Another feature of the image signal processing method of the present invention is that the image signal processed in the compression and expansion steps is an original signal serially output from the image sensing element.

Still another feature of the image signal processing method of the present invention is that the image signal processed in the compression and expansion steps is an original signal parallelly output from the image sensing element.

Still another feature of the image signal processing method of the present invention is that the image signal processed in the compression and expansion steps is a pseudo brightness and color difference signal (Y', u', v') generated based on an output from the image sensing element.

Still another feature of the image signal processing method of the present invention is that the compression and expansion steps are respectively vector quantization and decoding steps, which are performed according to a code book scheme.

Still another feature of the image signal processing method of the present invention is that the compression and expansion steps are performed according to a compression/expansion scheme that performs DCT, quantization, and variable length coding.

According to another aspect of the present invention, the foregoing object is attained by providing an image signal processing system comprising an image signal supply side which executes a predetermined signal process for an image signal output from an image sensing element, and outputs the processed image signal, and an image signal reception side which receives and uses the image signal output from the image signal supply side, wherein the image signal supply side includes compression means for compressing the image signal before performing at least one of white balance correction and γ correction for color information, the image signal reception side includes expansion means for expanding the compressed image signal, and color processing means, and the color processing means performs at least one of white balance correction and γ correction for the color information after completion of compression by the compression means and expansion by the expansion means.

Another feature of the image signal processing apparatus of the present invention is that the image signal processed by the compression and expansion means is an original signal serially output from the image sensing element.

Still another feature of the image signal processing apparatus of the present invention is that the image signal processed by the compression and expansion means is an original signal parallelly output from the image sensing element.

Still another feature of the image signal processing apparatus of the present invention is that the image signal processed by the compression and expansion means is a pseudo brightness and color difference signal (Y', u', v') generated based on an output from the image sensing element.

Still another feature of the image signal processing apparatus of the present invention is that the compression and expansion means are respectively vector quantization and decoding means, which are implemented according to a code book scheme.

Still another feature of the image signal processing apparatus of the present invention is that the compression and expansion means are implemented according to a compression/expansion scheme that performs DCT, quantization, and variable length coding.

According to still another aspect of the present invention, the foregoing object is attained by providing a storage medium storing a program for enabling a computer to execute a sequence according to the image signal processing method.

The storage medium of the present invention may store a program for enabling the computer to function as the aforementioned means.

According to still another aspect of the present invention, the foregoing object is attained by providing an image sensing apparatus comprising an image sensing element for sensing an image of an object and generating an image signal, and compression means for compressing the image signal output from the image sensing element to generate a compressed image signal without performing at least one of white balance correction and γ correction for color information indicated by the image signal.

Another feature of the image sensing apparatus of the present invention is that the apparatus further comprises write means for writing the compressed image signal output from the compression means in a storage medium.

Still another feature of the image sensing apparatus of the present invention is that the apparatus further comprises read means for reading out the compressed image signal stored in the storage medium, expansion means for expanding the compressed image signal read out by the read means, and color processing means for performing at least one of white balance correction and γ correction for the color information of the image signal expanded by the expansion means.

The invention is particularly advantageous since the data size upon transmitting an image signal or storing the signal in a storage medium can be greatly reduced and a high-quality image can be obtained by preventing the image quality after performing a color processing from deteriorating, as the color processing for performing at least white balance correction, γ correction, or the like for color information is executed after a compression processing of compressing an image signal and an expansion processing of expanding the compressed image signal are executed, upon executing the compression and expansion processings without executing the color processing.

According to another feature of the present invention, since pseudo brightness/color difference computations as a typical pre-processing upon executing color image signal processing are made on an image sensing element, high computation speed can be attained, and the memory capacity required for subsequent color signal processing can be reduced.

According to still another feature of the present invention, since the image sensing element can output an image signal of a format suitable for image compression, compression precision can be improved, and high-speed processing can be realized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.
(First Embodiment)

Figure 1:
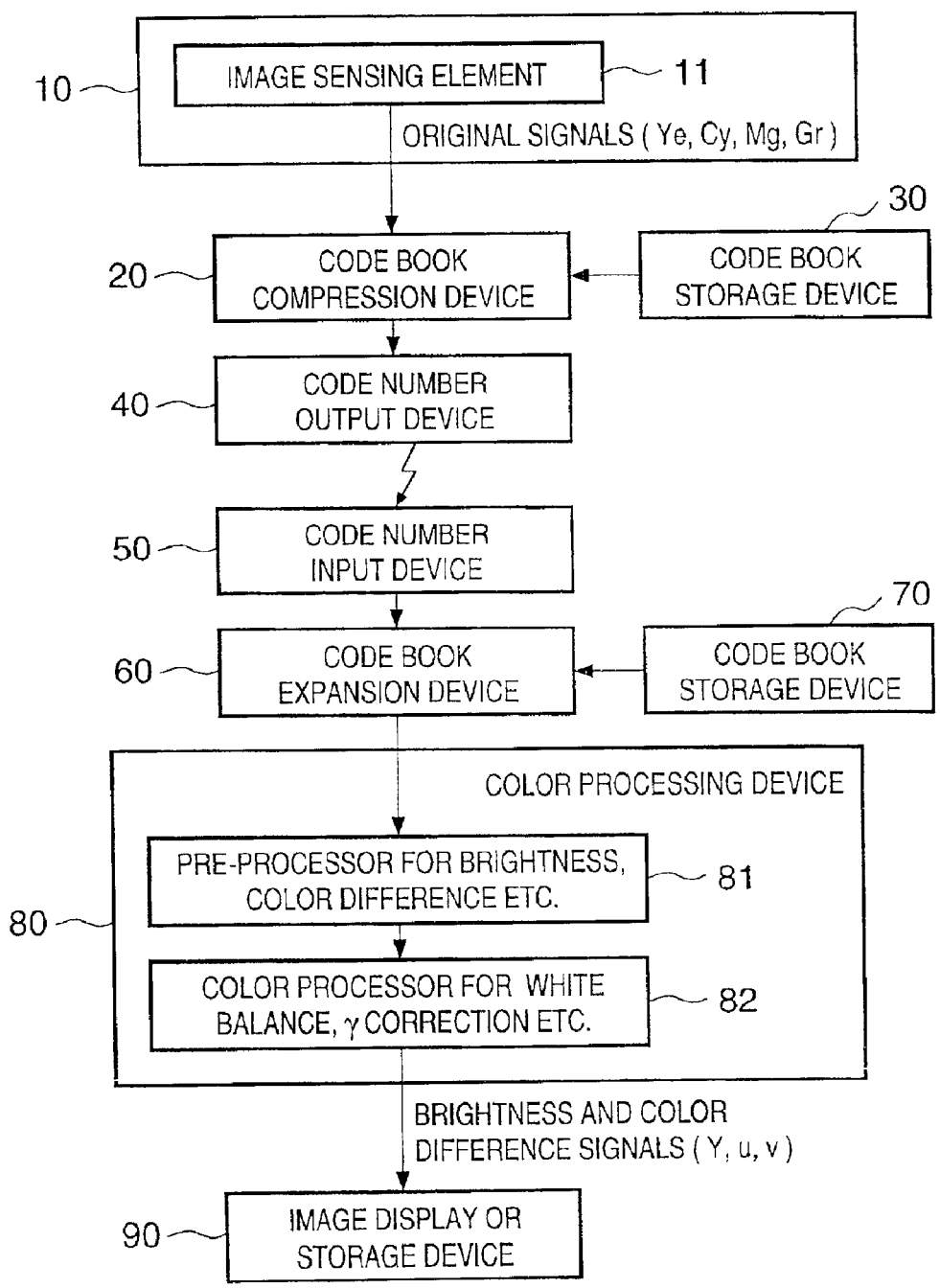
FIG. 1 is a block diagram showing the arrangement of an image signal processing system according to a first embodiment of the present invention.

FIG. 1 is a block diagram for explaining the first embodiment of the present invention. As shown in FIG. 1, the image signal transmitting side of the image signal processing system of this embodiment is constituted by an image sensing element IC chip (to be referred to as an image sensing unit hereinafter) 10, code book compression device 20, code book storage device 30, and code number output device 40.

The image signal receiving side is constituted by a code number input device 50, code book expansion device 60, code book storage device 70, color processing device 80, and image display or storage device 90.

The image sensing unit 10 has an image sensing element (light-receiving element) 11. In this embodiment, three complementary color filters and one primary color filter, i.e., cyan, yellow, magenta, and green filters are set on the image sensing element 11. Hence, the image sensing element 11 serially outputs original signals Ye, Cy, Mg, and Gr.

The original signals Ye, Cy, Mg, and Gr output from the image sensing unit 10 are input to the code book compression device 20. As described above, the code book compression device 20 compares patterns of the original signals Ye, Cy, Mg, and Gr for the predetermined number of pixels with a plurality of code books (patterns) pre-stored in the code book storage device 30.

The code book storage device 30 stores a plurality of codes in serial patterns corresponding to the original signals Ye, Cy, Mg, and Gr serially output from the image sensing unit 10. The code book compression device 20 finds out the most similar pattern from those patterns, and outputs the code number of this pattern. The code number output from the code book compression device 20 is transmitted from the code number output device 40 to the code number input device 50 via a medium such as a communication line or the like.

The code number sent via the communication line is received by the code number input device 50, which supplies it to the code book expansion device 60. The code book expansion device 60 reads out a pattern corresponding to the input code number from the code book storage device 70, and reconstructs the image data compressed by the code book expansion device 6.

The original signals Ye, Cy, Mg, and Gr reconstructed by the code book expansion device 60 are then supplied to the color processing device 80. The color processing device 80 comprises a pre-processor 81 for generating brightness and color difference signals from the input original signals Ye, Cy, Mg, and Gr, and a color processor 82 for executing various processings such as color correction processings, e.g., white balance correction, γ correction, and the like with respect to color information, required for obtaining higher image quality.

Hence, the original signals Ye, Cy, Mg, and Gr input from the code book expansion device 60 undergo predetermined color processings in the color processing device 80, thus generating and outputting a brightness signal (Y) and color difference signals (u, v).

The brightness signal (Y) and color difference signals (u, v) output from the color processing device 80 are supplied to the image display or storage device 90, thus displaying an image or storing the data in a storage medium.

As described above, the image signal processing system according to this embodiment executes the color correction processings which are performed to obtain higher image quality, not before the compression processing on the image signal but after the expansion processing on the image signal. Hence, deterioration of image quality due to block noise or high-frequency noise produced upon executing the compression process→ expansion process can be minimized, an amount of information to be transmitted via a communication line can be greatly reduced, and the image signal after the color processings can be prevented from deteriorating, thus obtaining high image quality.
(Second Embodiment)

Figure 2:
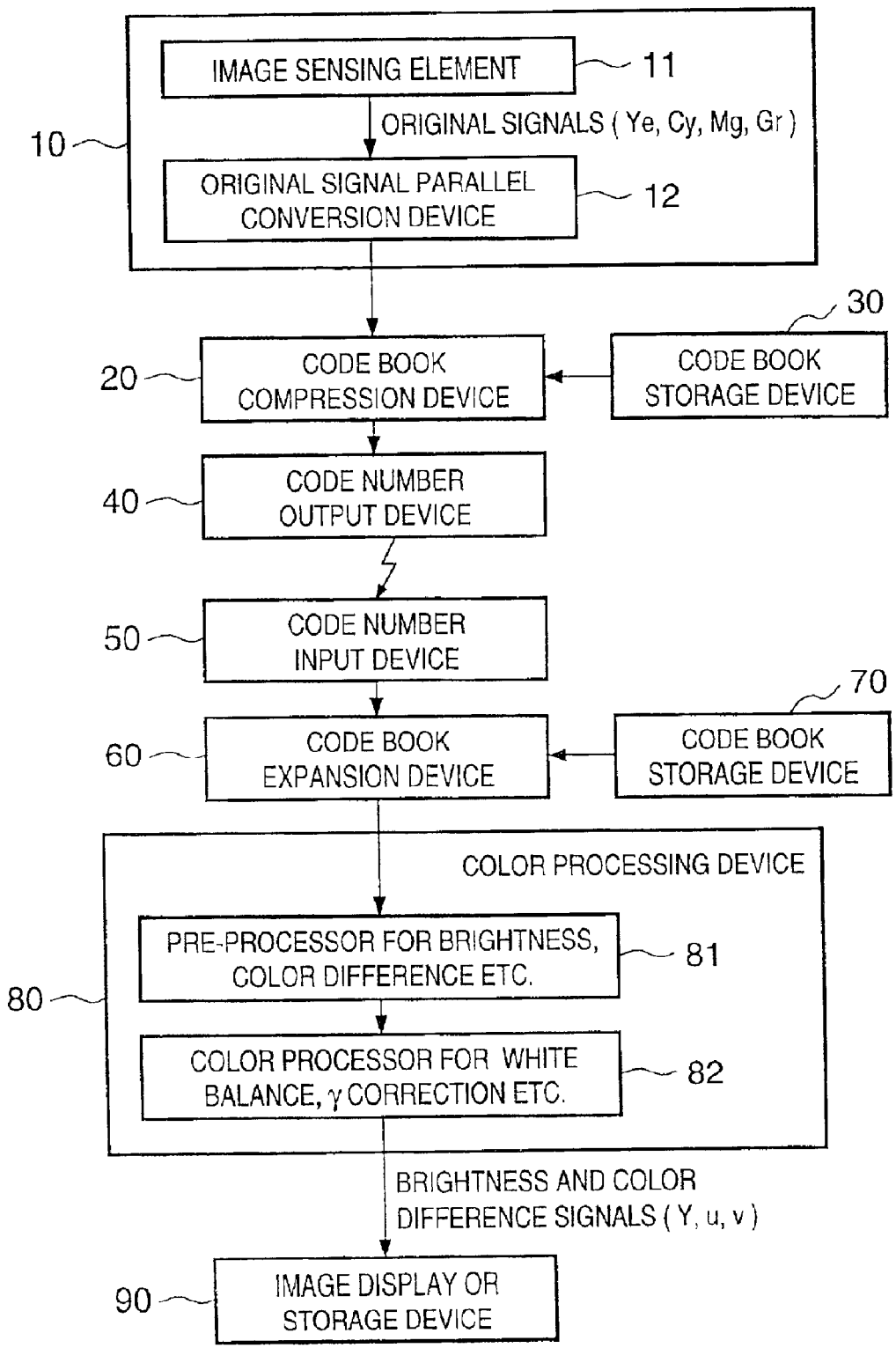
FIG. 2 is a block diagram showing the arrangement of an image signal processing system according to a second embodiment of the present invention.

The second embodiment of the present invention will be described below with reference to FIG. 2. Note that the same reference numerals in this embodiment denote the same parts as those described in the first embodiment, and a detailed description thereof will be omitted.

In case of the second embodiment, the image sensing unit 10 includes an original signal parallel conversion device 12 to parallelly output serial original signals obtained from the image sensing unit 10. Since the original signals Ye, Cy, Mg, and Gr are parallelly output from the image sensing unit 10, in addition to the advantage attained by the first embodiment, pattern comparison in the code book compression device 20 can be performed in units of blocks each consisting of 4×4 pixels. Hence, high-speed pattern comparison can be attained, and the overall processing speed can be improved.

Figure 3:
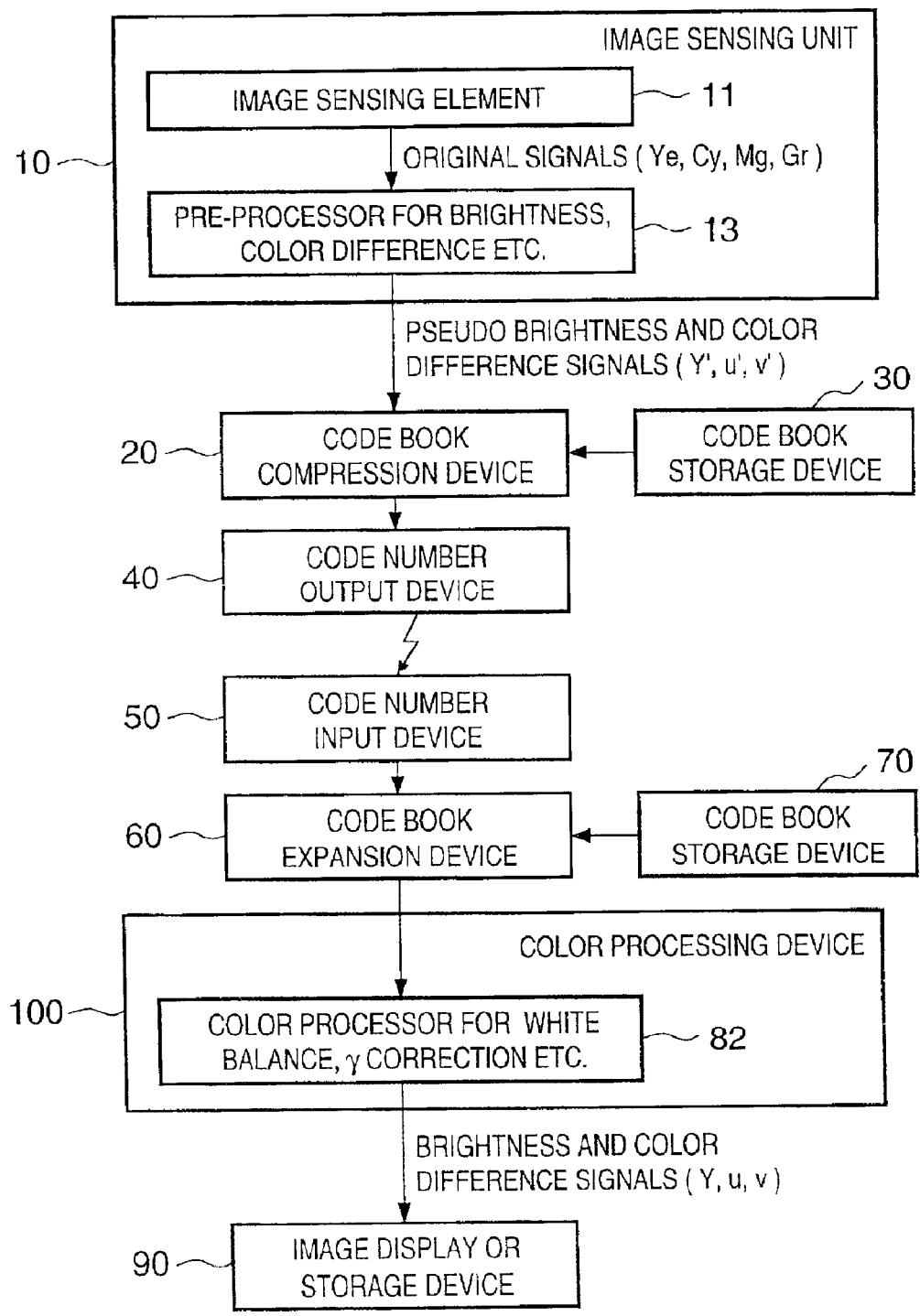
FIG. 3 is a block diagram showing the arrangement of an image signal processing system according to a third embodiment of the present invention.

An image signal processing system according to the third embodiment of the present invention will be described below with reference to FIG. 3.

The feature of this embodiment is that the image sensing unit 10 includes a pre-processor 13 for generating brightness and color difference signals from original signals Ye, Cy, mg, and Gr. In this embodiment, the pre-processor 81, which is required in the first and second embodiments, can be omitted from a color processing device 100, which can include the color processor 82 alone.

In this manner, since the pre-processor 13 is included in the image sensing unit 10, computations for generating pseudo brightness and color difference signals (Y', u', v') can be performed on the same chip as the image sensing element 11, and these generated signals can be output. Hence, high-speed computations can be attained, and the memory capacity required for the subsequent processors can be reduced.

Since pseudo brightness and color difference signals (Y', u', v') of a format suitable for information compression can be output, compression precision can be improved, and the compression speed can be greatly improved.

Furthermore, in this embodiment, since the color processing device 100 need not generate any pseudo brightness and color difference signals (Y', u', v'), the arrangement of the color processing device 100 can be simplified, and the time required for color processing can be shortened.

(Fourth Embodiment)

Figure 4:
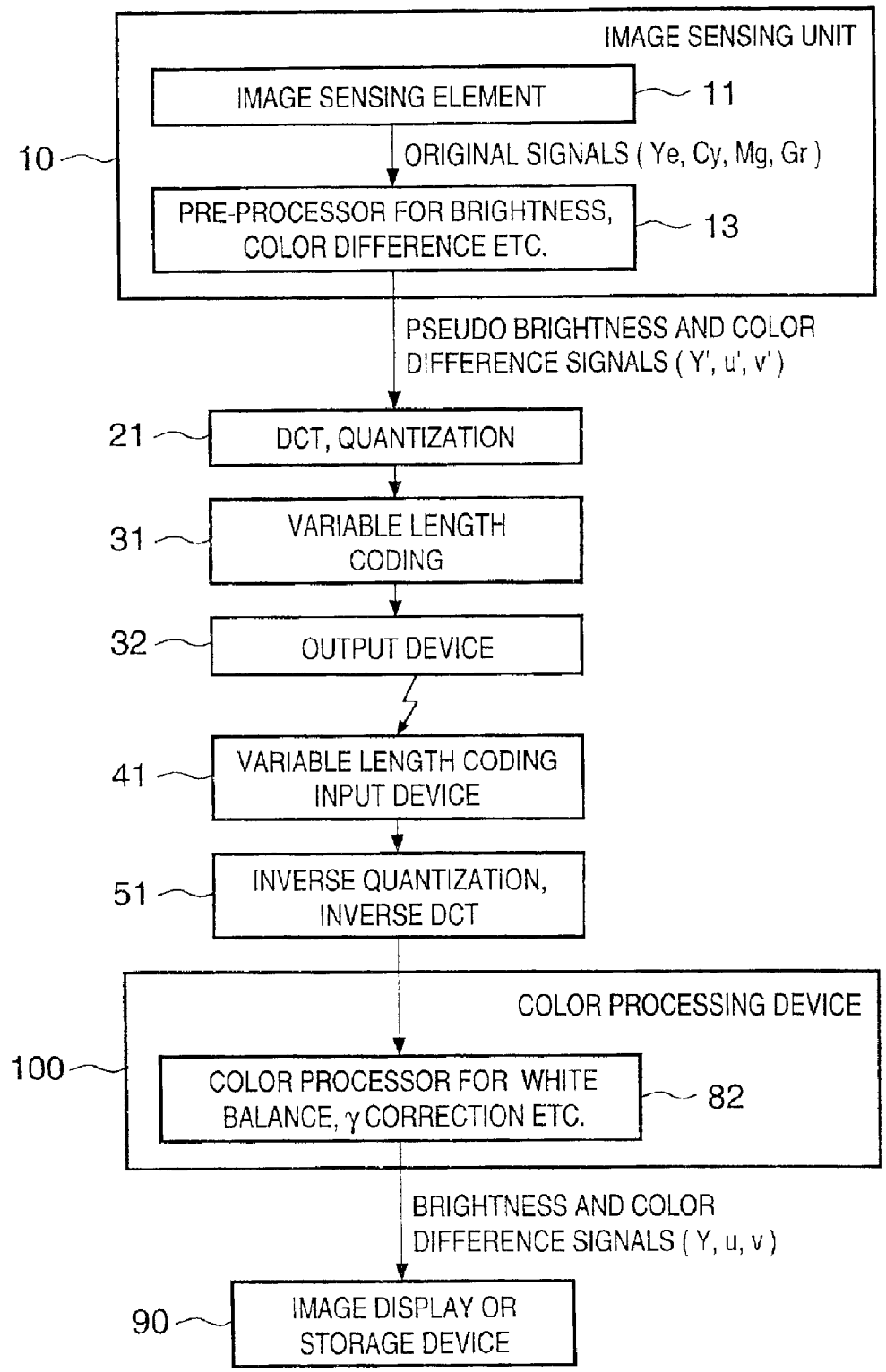
FIG. 4 is a block diagram showing the arrangement of an image signal processing system according to a fourth embodiment of the present invention.

The fourth embodiment of the present invention will be explained below with reference to FIG. 4. In the first to third embodiments, a case where compression based on the code book scheme is used as the information compression method is described. In this embodiment, a compression device 21 for performing DCT and quantization, variable length coding device 31, and output device 32 as information compression devices are provided to the image signal transmitting side. On the other hand, a variable length coding input device 41, and information expansion device 51 for performing reconstruction of information such as inverse quantization and inverse DCT processings are provided to the image signal receiving side.

In the image signal processing system with the aforementioned arrangement as well, the amount of information to be transmitted via a line can be greatly reduced, and high image quality can be obtained by minimizing deterioration of the image quality, as in the aforementioned embodiments.

Figure 5:
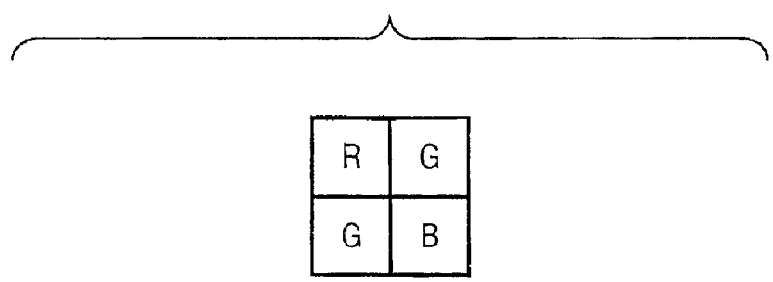
FIG. 5 is a view for explaining the sequence for generating pseudo brightness and color difference signals (Y', u', v')

Pseudo brightness and color difference signals (Y', u', v') generated by the pre-processor 13 can be generated according to conventional computations. FIG. 5 shows an example of an arrangement in which R, G, and B primary color filters are set on the image sensing element 11. In this case, a pseudo brightness signal (Y') is generated by computing (R+2G+B). A pseudo color difference signal (u') is generated by computing (R−Y'), and the other pseudo color difference signal (v') is generated by computing (B−Y').

Figure 6:
FIG. 6 is a view for explaining the sequence for generating pseudo brightness and color difference signals (Y', u', v')

FIG. 6 shows an example of an arrangement in which complementary color filters are set on the image sensing element 11. In this case, in the first and second lines, a pseudo brightness signal (Y') is generated by computing $\{(Ye+Mg)+(Cy+G)\} \times \frac{1}{2} = \frac{1}{2}(2B+3G+2R)$, and a pseudo color difference signal (u') is generated by computing $\{(Ye+Mg)(Cy+G)\}=(2R-G)$.

In the third and fourth lines, a pseudo brightness signal (Y') is generated by computing $\{(Ye+G)+(Cy+Mg)\} \times \frac{1}{2} = \frac{1}{2}(2B+3G+2R)$, and a pseudo color difference signal (−v') is generated by computing $\{(Ye+G)+(Cy+Mg)\}=-(2B-G)$.

(Fifth Embodiment)

In the above embodiments, the pseudo brightness and color difference signals (Y', u', v') are generated by internal computations of the image sensing unit 10. Also, various other computations may be made in the image sensing unit 10.

Figure 7:
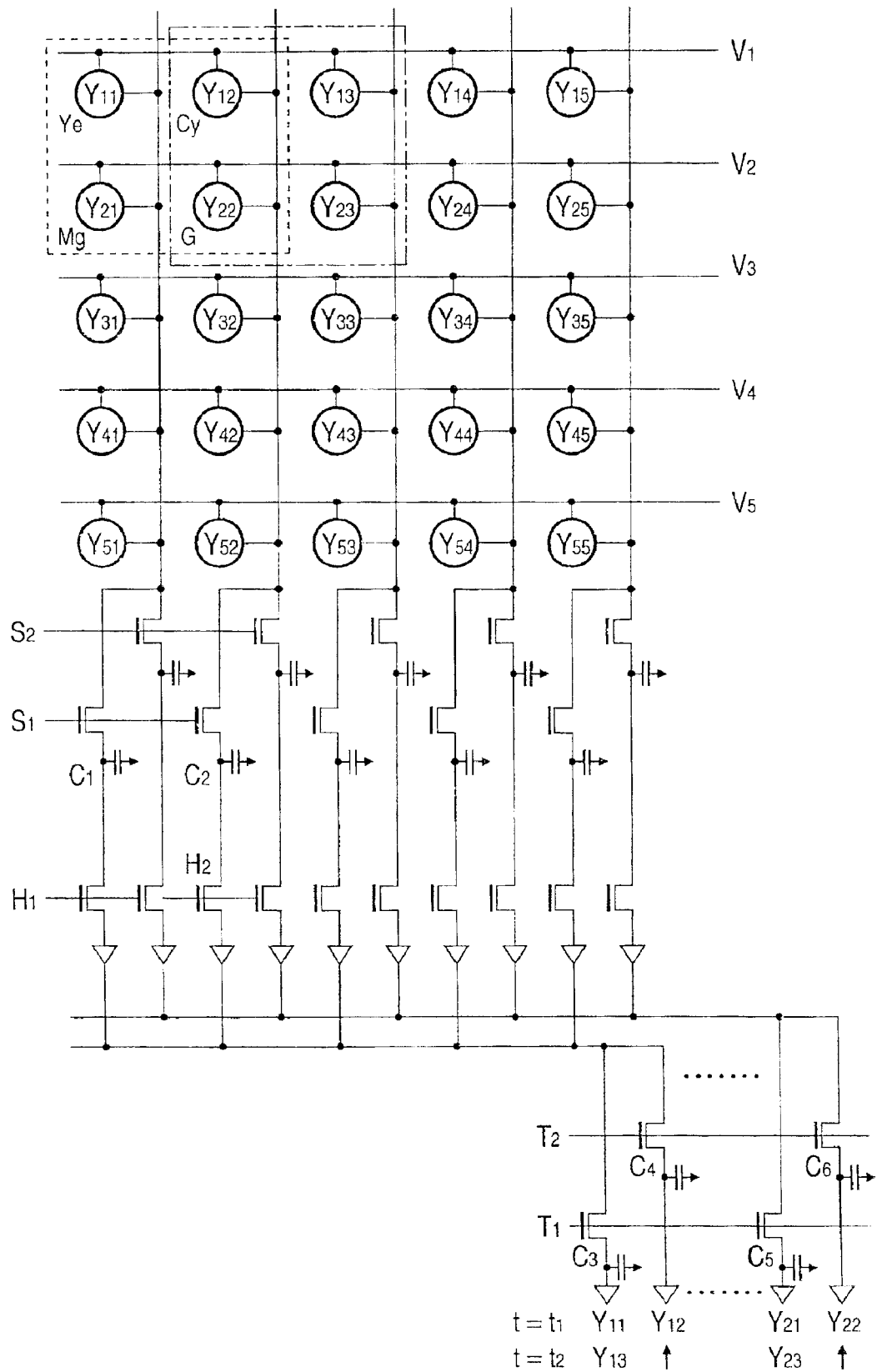
FIG. 7 is a circuit diagram showing a fifth embodiment of the present invention and, in particular, an example of an arithmetic operation circuit used in an image sensing unit.

This embodiment will explain a case where a plurality of pixel signals can be parallelly output in units of predetermined pixel blocks by matrix computations. An example of such computations will be explained below. FIG. 7 is a circuit diagram used for performing matrix computations to parallelly output pixel signals in units of "12×2 blocks", and FIG. 8 is a timing chart showing the operation timings of the respective units shown in FIG. 7.

Figure 8:
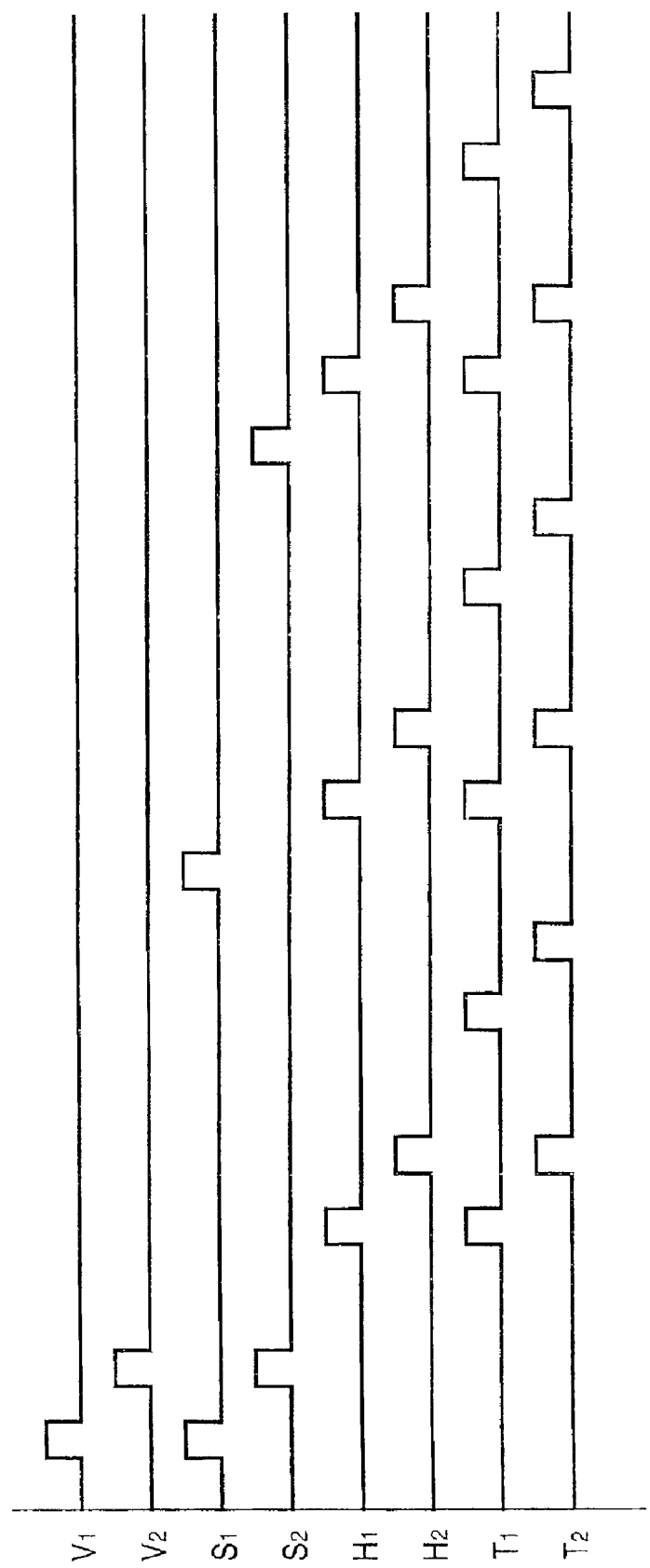
FIG. 8 is a timing chart showing the operation timings of the respective units of the circuit shown in FIG. 7.

As shown in FIGS. 7 and 8, when a gate pulse ($S_1$) is input at the input timing of a vertical scanning pulse ($V_1$), a pixel signal ($Y_{11}$) is read out (a pixel signal ($Y_{12}$) is also read out), and is held in a memory capacitor ($C_1$, $C_2$). When a gate pulse ($S_2$) is input at the input timing of a vertical scanning pulse ($V_2$), a pixel signal ($Y_{21}$) is read out (a pixel signal ($Y_{22}$) is also read out), and is held in the memory capacitor.

In response to a gate pulse ($H_1$), the pixel signals ($Y_{11}$, $Y_{21}$) held in the memory capacitors are read out. Note that the pixel signals ($Y_{12}$, $Y_{22}$) are also read out at the input timing of a gate pulse ($H_2$). The pixel signal ($Y_{11}$) is held in the memory capacitor ($C_3$), the pixel signal ($Y_{12}$) in the memory capacitor ($C_4$), the pixel signal ($Y_{21}$) in the memory capacitor ($C_5$), and the pixel signal (Ye) in the memory capacitor ($C_6$).

Upon receiving a gate pulse ($T_1$) at time $t_1$, the pixel signals respectively held in the memory capacitors ($C_3$ to $C_6$) are simultaneously output, and the signals $Y_{11}$, $Y_{12}$ $Y_{21}$, and $Y_{22}$ are parallelly output, as shown in FIG. 7.

Upon receiving a gate pulse ($T_2$) at time $t_2$, pixel signals ($Y_{13}$, $Y_{12}$, $Y_{23}$, $Y_{22}$) in a block shifted by one pixel in the horizontal direction are parallelly output. In this case, the pixel signals respectively held in the memory capacitors ($C_4$, $C_5$) are output as the pixel signals ($Y_{12}$, $Y_{22}$).

Figure 9A:
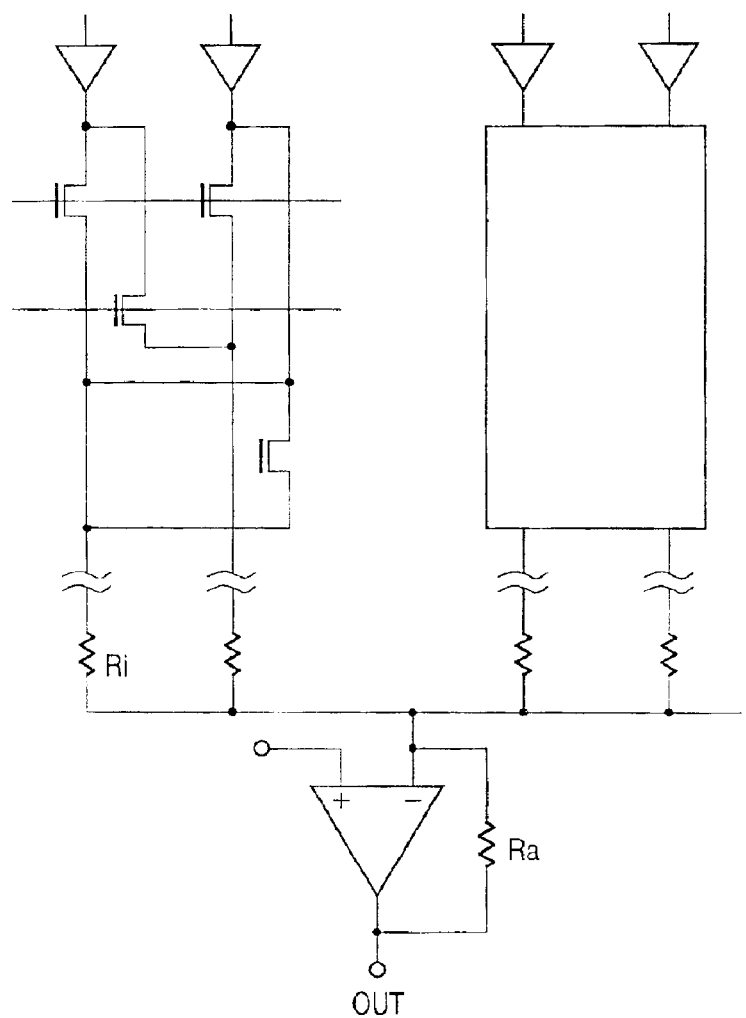
FIGS. 9A and 9B are circuit diagrams showing an example upon weighting a pixel signal, and an example upon computing the difference between pixel signals.
Figure 9B:
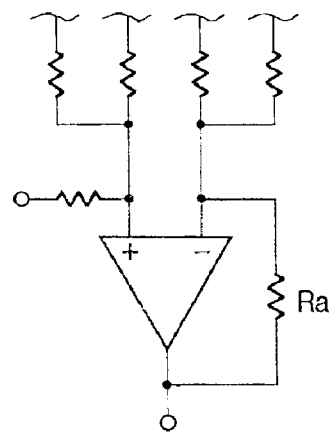
Figure 10:
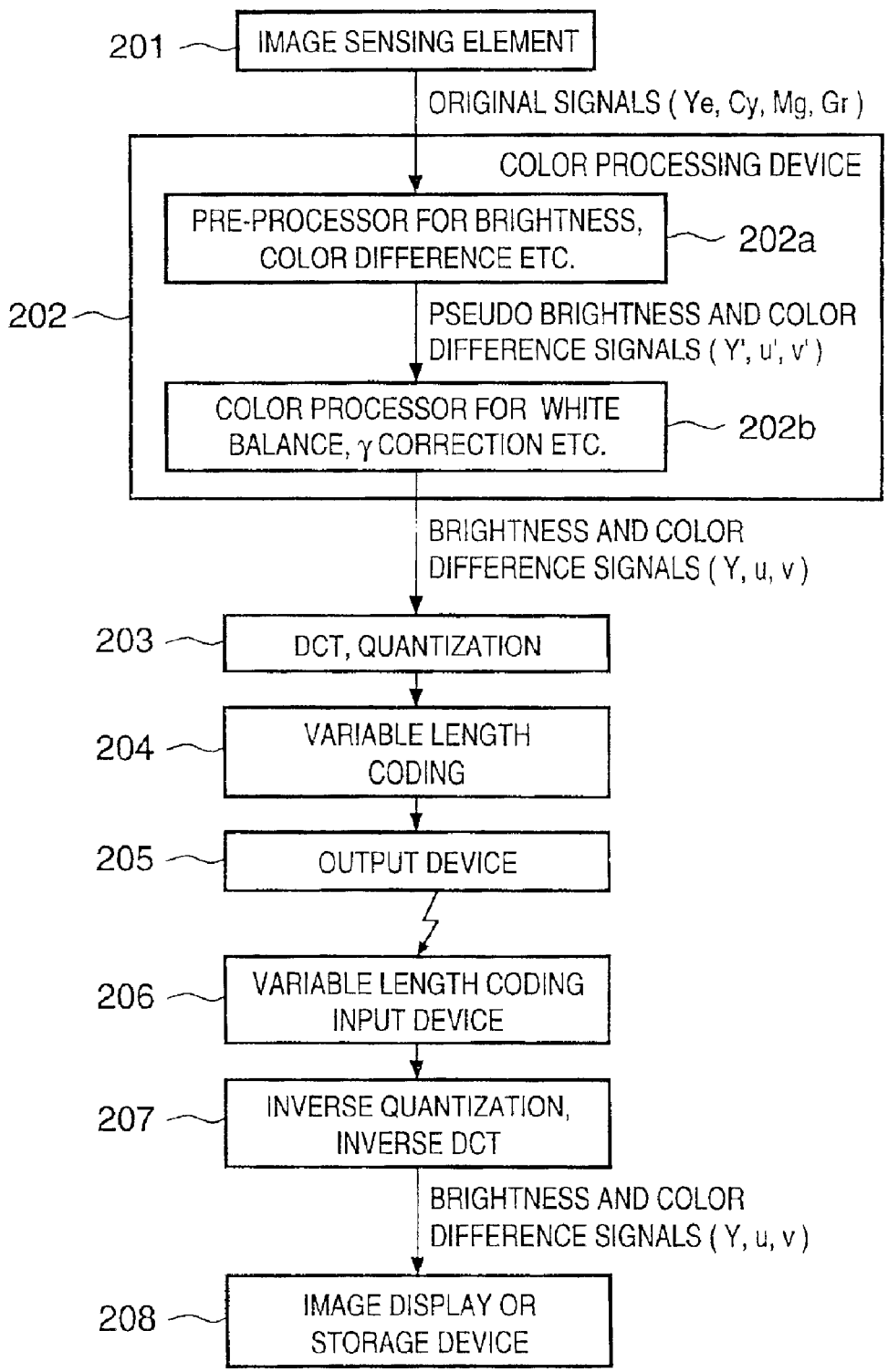
FIG. 10 is a block diagram showing an example of the arrangement of a conventional image signal processing system.
Figure 11:
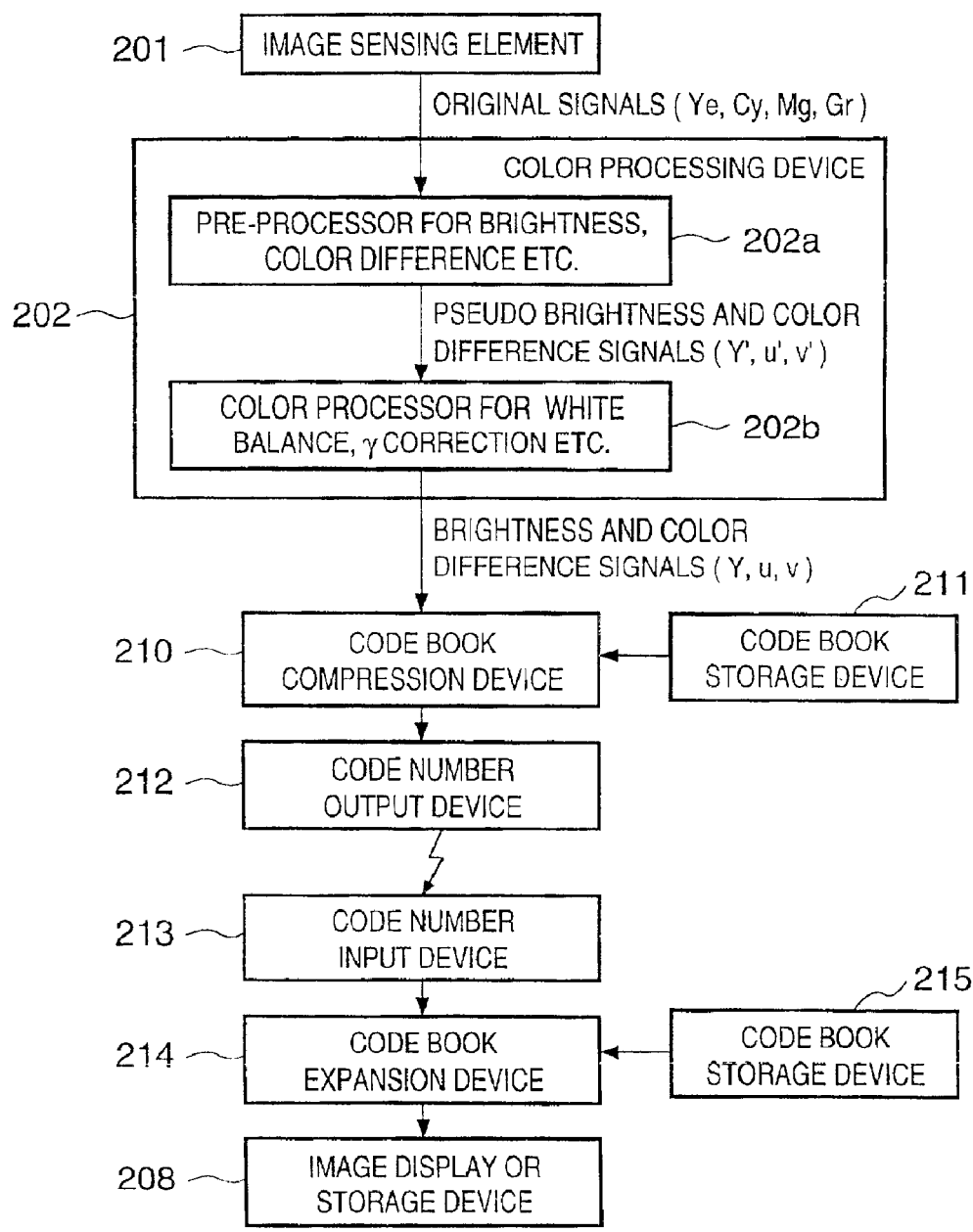
FIG. 11 is a block diagram showing another example of the arrangement of a conventional image signal processing system.

In the aforementioned example, the respective pixel signals are directly output. As shown in FIG. 9A, resistors (Ri) may be inserted in the output lines of the respective pixel signals, and when the resistances of the resistors (Ri) are changed to change their ratios to the resistance of a resistor (Ra) connected to an amplifier, pixel signals can be weighted in matrix computations. Also, as shown in FIG. 9B, by inputting a pixel signal to the (−) input terminal of an amplifier, a difference may be computed.

(Sixth Embodiment)

The sixth embodiment of the present invention will be described below with reference to FIG. 12.

In the above embodiments, compressed signals are externally output via a medium such as a communication line or the like. This embodiment will explain an example in which the present invention is applied to an image sensing apparatus, which temporarily stores the compressed signals in a storage medium, reconstructs them, and performs color processings after compression/expansion processings.

Figure 12:
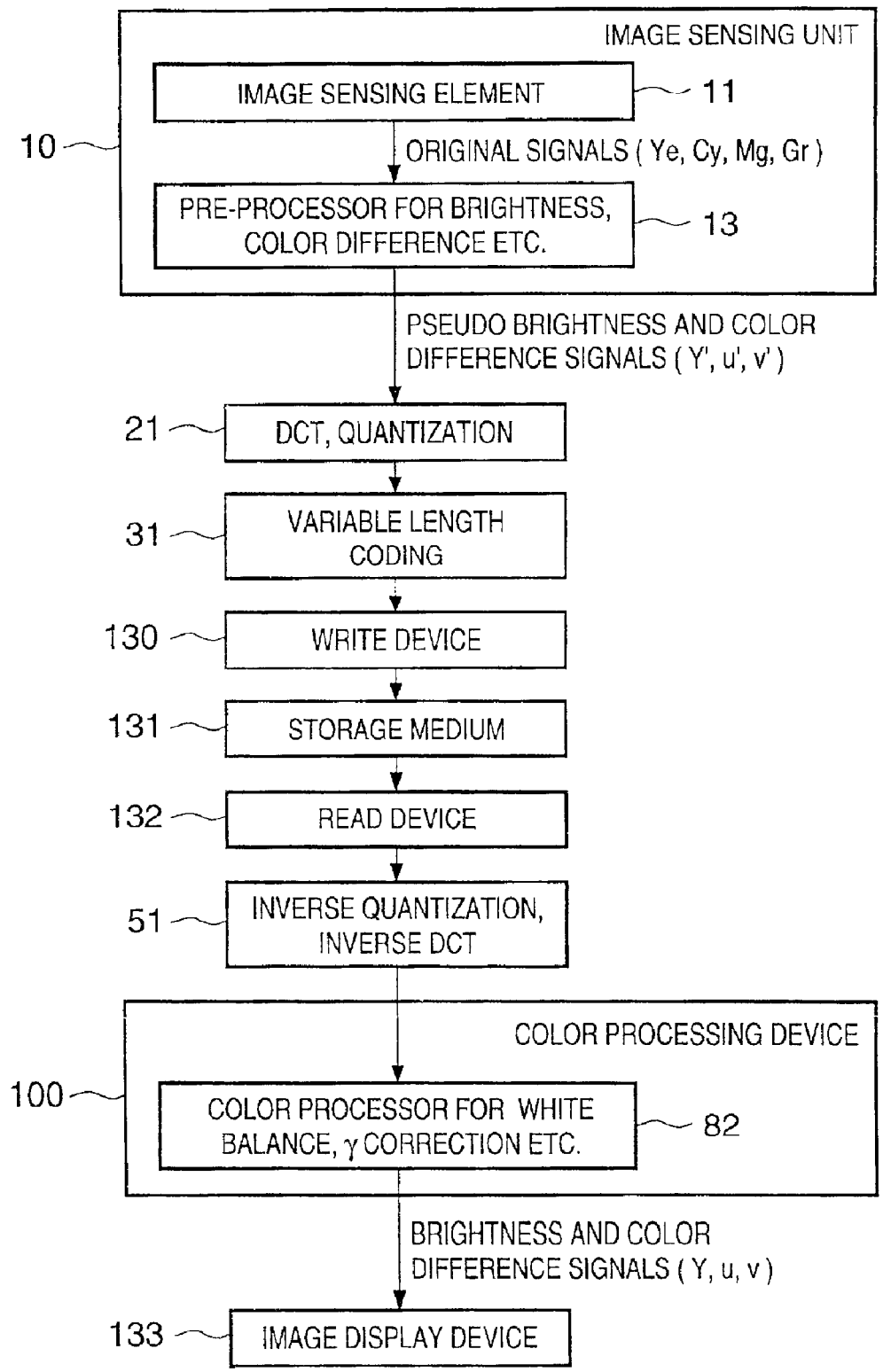
FIG. 12 is a block diagram showing the arrangement of an image sensing apparatus according to a sixth embodiment of the present invention.

FIG. 12 is a block diagram showing the arrangement of an image sensing apparatus according to this embodiment. The arrangement shown in FIG. 12 is similar to that shown in FIG. 4, except that a write device 130, storage medium 131, and read device 132 are provided between the variable length coding device 31 and expansion device 51.

With this arrangement, the storage capacity required for storing an image signal output from the image sensing unit 10 in the storage medium 131 can be greatly reduced. Furthermore, since the image signal read out from the storage medium 131 is expanded and reconstructed by the expansion unit 51, and is then subjected to color processings in the color processing device 100, deterioration of the image quality can be minimized, and a high-quality image can be displayed on an image display device 133.

Note that the image sensing apparatus of this embodiment may comprise only the arrangement from the image sensing unit 10 to storage medium 131.

It goes without saying that the present invention can also be achieved by supplying a storage medium, which stores a program code of software that implements the functions of the above-mentioned embodiments, to a system or apparatus, and reading out and executing the program code stored in the storage medium by a computer (or a CPU or MPU; neither are shown) of the system or apparatus. In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) or the like running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image signal processing method of processing an image signal parallelly output in units of a plurality of pixels from an image sensing element, comprising:

a compression step, of compressing an information volume of the image signal without performing color processing;

an expansion step, of expanding the compressed image signal; and a color processing step, executed after completion of said expansion step, wherein the color processing performed in said color processing step includes at least one of white balance correction and white color balance, and said compression step includes comparing a plurality of patterns, each representing predetermined information, with the image signal parallelly output in units of the plurality of pixels from the image sensing element for the purpose of compressing the information volume of the image signal, and outputting one of a plurality of code numbers, each corresponding to one of the plurality of patterns, obtained based on a result of the comparison as the compressed image signal.

2. The method according to claim 1, wherein the image signal processed in said compression and expansion steps is a pseudo brightness and color difference signal (Y', u', v') generated based on an output from the image sensing element.

3. The method according to claim 1, wherein said compression and expansion steps are, respectively, vector quantization and decoding steps, which are performed according to a code book scheme.

4. The method according to claim 1, wherein said compression and expansion steps are performed according to a compression/expansion scheme that performs DCT, quantization, and variable length coding.

5. An image signal processing system comprising a first unit which executes a predetermined signal processing for an image signal parallelly output in units of a plurality of pixels from an image sensing element, and outputs the processed image signal, and a second unit which receives and uses the image signal output from said first unit, wherein said first unit includes compression means for compressing the image signal before performing at least one of white balance correction and γ correction for color information, said second unit includes expansion means for expanding the compressed image signal, and color processing means for performing color processing, said color processing means performs at least white one of balance correction and v correction for the color information after completion of compression by said compression means and expansion by said expansion means, and said compression means includes a plurality of patterns, each representing predetermined information, and code numbers, each corresponding to one of the plurality of patterns, compares the plurality of patterns with the image signal parallelly output in units of the plurality of pixels from the image sensing element for the purpose of compressing the image signal, and outputs the code number obtained based on a result of the comparison as the compressed image signal.

6. The system according to claim 5, wherein the image signal processed by said compression and expansion means is a pseudo brightness and color difference signal (Y', u', v') generated based on an output from the image sensing element.

7. The system according to claim 5, wherein said compression and expansion means are, respectively, vector quantization and decoding means, which are performed according to a code book scheme.

8. The system according to claim 5, wherein said compression and expansion means use a compression/expansion scheme that performs DCT, quantization, and variable length coding.

9. A storage medium storing a program which causes a computer to execute the sequences according to the method recited in any one of claims 1 to 4.

10. A storage medium storing a program which causes a computer to function as each of said compression means, expansion means, color processing means, vector quantization means and vector decoding means recited in any one of claims 5 to 8.

11. An image sensing apparatus comprising:

an image sensing element for sensing an image of an object and generating an image signal;

compression means for compressing the image signal parallelly output in units of a plurality of pixels from said image sensing element to generate a compressed image signal without performing at least one of white balance correction and γ correction for color information indicated by the image signal;

expansion means for expanding the compressed image signal; and color processing means for performing at least one of white balance correction and γ correction for the color information of the image signal expanded by said expansion means, wherein said compression means includes a plurality of patterns, each representing predetermined information, and code numbers, each corresponding to one of the plurality of patterns, compares the plurality of patterns with the image signal parallelly output in units of the plurality of pixels from the image sensing element for the purpose of compressing the image signal, and outputs the code number obtained based on a result of the comparison as the compressed image signal.

12. The apparatus according to claim 11, further comprising write means for writing the compressed image signal output from said compression means in a storage medium.

13. The apparatus according to claim 12, further comprising:

read means for reading out the compressed image signal stored in said storage medium.

14. An image sensing apparatus comprising:

an image sensing element, adapted to sense an image of an object, generate an image signal and parallelly output the image signal in units of a plurality of pixels;

a compression circuit, adapted to compress the image signal output from the image sensing element to generate a compressed image signal without performing white balance correction for color information indicated by the image signal; and a write-in circuit, adapted to write the compressed image signal output from said compression circuit into a storage medium, wherein said compression circuit includes a plurality of patterns, each representing predetermined information, and code numbers, each corresponding to one of the plurality of patterns, compares the plurality of patterns with the image signal parallelly output in units of the plurality of pixels from said image sensing element for the purpose of compressing the image signal, and outputs the code number obtained based on a result of the comparison as the compressed image signal.

15. An image sensing apparatus comprising:

an image sensing element, adapted to sense an image of an object, generate an image signal and parallelly output the image signal in units of a plurality of pixels;

a compression circuit, adapted to compress the image signal output from the image sensing element to generate a compressed image signal without performing γ-correction for color information indicated by the image signal; and a write-in circuit, adapted to write the compressed image signal output from said compression circuit into a storage medium, wherein said compression circuit includes a plurality of patterns, each representing predetermined information, and code numbers, each corresponding to one of the plurality of patterns, compares the plurality of patterns with the image signal parallelly output in units of the plurality of pixels from said image sensing element for the purpose of compressing the image signal, and outputs the code number obtained based on a result of the comparison as the compressed image signal.

* * * * *

UNITED STATES PATENT AND TRADEMARK OFFICE
CERTIFICATE OF CORRECTION

| | |
|---|---|
| PATENT NO. | : 6,898,310 B1 |
| APPLICATION NO. | : 09/343186 |
| DATED | : May 24, 2005 |
| INVENTOR(S) | : Tadahiro Ohmi et al. |

It is certified that error appears in the above-identified patent and that said Letters Patent is hereby corrected as shown below:

ON THE TITLE PAGE ITEM [76]:

Inventors, "Tadahiro Ohmi, 1-17-301, Komegafukuro 2-chome, Aoba-ku, Sendai-shi, Miyagi-ken (JP); Shigetoshi Sugawa, c/o Canon Kabushiki Kaisha 30-2, Shimomaruko 3-chome, Ohta-ku, Tokyo (JP); Isamu Ueno, c/o Canon Kabushiki Kaisha, 30-2, Shimomaruko 3-chome, Ohta-ku, Tokyo (JP); Katsuhisa Ogawa, c/o Canon Kabushiki Kaisha 30-2, Shimomaruko 3-chome, Ohta-ku, Tokyo (JP); Toru Koizumi, c/o Canon Kabushiki Kaisha 30-2, Shimomaruko 3-chome, Ohta-ku, Tokyo (JP); Tetsunobu Kochi, c/o Canon Kabushiki Kaisha 30-2, Shimomaruko 3-chome, Ohta-ku, Tokyo (JP); Katsuhito Sakurai, c/o Canon Kabushiki Kaisha, 30-2, Shimomaruko 3-chome, Ohta-ku, Tokyo (JP); Takahiro Nakayama, 2-3-112, Kunimi 5-chome, Aoba-ku, Sendai-shi, Miyagi-ken (JP); Tatsuo Morimoto, 3-2, Kaimisugi 6-chome, Aoba-ku, Sendai-shi, Miyagi-ken (JP)"

ON THE TITLE PAGE ITEM [76] SHOULD READ

--Tadahiro Ohmi, Miyagi (JP); Shigetoshi Sugawa, Kanagawa (JP); Isamu Ueno, Kanagawa (JP); Katsuhisa Ogawa, Tokyo (JP); Toru Koizumi, Kanagawa (JP); Tetsunobu Kochi, Kanagawa (JP); Katsuhito Sakurai, Miyagi (JP); Takahiro Nakayama, Miyagi (JP); Tatsuo Morimoto, Miyagi (JP)--.

ON THE TITLE PAGE ITEM [57] ABSTRACT:

Line 10, "or" should read --or $\gamma$--.

COLUMN 7:

Line 9, "improved." should read --improved. ¶ (Third Embodiment)--; and
Line 16, "mg," should read --Mg,--.

UNITED STATES PATENT AND TRADEMARK OFFICE
CERTIFICATE OF CORRECTION

PATENT NO. : 6,898,310 B1
APPLICATION NO. : 09/343186
DATED : May 24, 2005
INVENTOR(S) : Tadahiro Ohmi et al.

It is certified that error appears in the above-identified patent and that said Letters Patent is hereby corrected as shown below:

COLUMN 8:

Line 4, "Mg)(Cy" should read --Mg)-(Cy--;
Line 20, ""12x2 blocks"," should read --"2x2 blocks",--;
Line 30, "$(Y_{11},$" should read --$(Y_{11},$--;
Line 36, "(Ye)" should read --$(Y_{22})$--; and
Line 40, "$Y_{12}$" should read --$Y_{12},$--.

Signed and Sealed this

Tenth Day of February, 2009

JOHN DOLL
*Acting Director of the United States Patent and Trademark Office*